(12) United States Patent
Fiorani et al.

(10) Patent No.: US 7,101,170 B2
(45) Date of Patent: Sep. 5, 2006

(54) TAKE-OUT DEVICE FOR ROTARY BLOW MOLDING MACHINE

(75) Inventors: David N. Fiorani, Jacobs, PA (US); John M. Mathy, Jr., Stewartstown, PA (US)

(73) Assignee: Graham Engineering Corporation, York, PA (US)

(*) Notice: Subject to any disclaimer, the term of this patent is extended or adjusted under 35 U.S.C. 154(b) by 0 days.

(21) Appl. No.: 11/081,994

(22) Filed: Mar. 16, 2005

(65) Prior Publication Data
US 2005/0158422 A1    Jul. 21, 2005

Related U.S. Application Data

(63) Continuation of application No. 10/393,587, filed on Mar. 21, 2003, now Pat. No. 6,923,933.

(51) Int. Cl.
*B29C 49/70* (2006.01)

(52) U.S. Cl. ..................... 425/537; 425/540
(58) Field of Classification Search ........... 425/537, 425/540; B29C 49/70
See application file for complete search history.

(56) References Cited

U.S. PATENT DOCUMENTS

| | | | |
|---|---|---|---|
| 2,096,264 A | 10/1937 | Schutz | |
| 2,696,927 A | 12/1954 | Copping | |
| 2,759,593 A | 8/1956 | Copping | |
| 2,888,131 A | 5/1959 | Allen | |
| 3,011,667 A | 12/1961 | Copping | |
| 3,770,098 A * | 11/1973 | Baugnies et al. | 198/377.03 |
| 3,949,860 A * | 4/1976 | Bilodeau | 198/470.1 |
| 3,981,667 A * | 9/1976 | Bilodeau | 425/539 |
| 4,041,124 A | 8/1977 | Seelye et al. | |
| 4,213,750 A | 7/1980 | Kubota et al. | |
| 4,589,838 A | 5/1986 | Ziegler | |
| 4,752,206 A * | 6/1988 | Nowicki et al. | 425/537 |
| 4,902,217 A | 2/1990 | Martin et al. | |
| 5,039,298 A * | 8/1991 | Takakusaki et al. | 425/504 |
| 5,681,597 A * | 10/1997 | Aguilar et al. | 425/537 |
| 5,683,729 A | 11/1997 | Valles | |
| 5,759,593 A | 6/1998 | Weber et al. | |
| 5,865,292 A | 2/1999 | Aguilar et al. | |
| 6,062,845 A | 5/2000 | Conaway et al. | |
| 6,136,254 A * | 10/2000 | Weber | 264/334 |
| 6,152,723 A | 11/2000 | Winter et al. | |
| 6,386,858 B1 | 5/2002 | Riddell | |
| 6,669,461 B1 | 12/2003 | Taylor et al. | |
| 6,923,933 B1 * | 8/2005 | Fiorani et al. | 425/537 |
| 2002/0136794 A1 | 9/2002 | Cargile et al. | |
| 2004/0219253 A1 | 11/2004 | Crider et al. | |

FOREIGN PATENT DOCUMENTS

| | | |
|---|---|---|
| WO | WO 9903763 A1 | 1/1999 |
| WO | WO 0107233 A1 | 2/2001 |
| WO | WO 0136306 A1 | 5/2001 |
| WO | WO 0144084 A2 | 6/2001 |
| WO | WO 0234652 A1 | 5/2002 |

* cited by examiner

*Primary Examiner*—Robert B. Davis
(74) *Attorney, Agent, or Firm*—Pepper Hamilton LLP (57) ABSTRACT

A blow mold system take-out device includes a plurality of transfer heads positioned around a hub, and a plurality of arms associated with a plurality of the transfer heads. The arms receive and clamp a molded product. Each transfer head with arms moves around the hub to a position where the arms release the molded product onto a takeaway device.

24 Claims, 8 Drawing Sheets

TAKE-OUT DEVICE FOR ROTARY BLOW MOLDING MACHINE

RELATED APPLICATIONS AND CLAIM OF PRIORITY

This application is a continuation of, claims priority to, and incorporates by reference U.S. patent application Ser. No. 10/393,587, filed Mar. 21, 2003, and now U.S. Pat. No. 6,923,933.

FIELD

The invention relates to devices and methods which remove blow molded products from between open mold halves and transport the products for subsequent processing and, particularly, to take-out devices for high speed vertical rotary blow molding machines where blow molded products are removed at high speed and reliably placed on takeaway conveyors.

DESCRIPTION OF THE PRIOR ART

High speed rotary blow molding machines are well known. These machines include a large number of molds arranged in a circle and rotated around the circle at a speed as high as 8½ revolutions per minute or possibly higher. A continuous parison or parisons are extruded between open mold halves, which close to capture parison segments in mold cavities. The captured parison segments are blown in the cavities and set to form blow molded products. The molds open at an ejection station and the products are stripped from between the mold halves by knock out rods.

In conventional high speed rotary blow molding machines the ejection station is located at the bottom of the wheel. After the blow molded products are stripped from the open mold halves by the knock out rods, the rods are withdrawn, the blow molded products are released from between the open mold and under the force of gravity fall away from the machine. The high rotation of velocity of the machine means that the freely released blow molded products travel at a high speed and fall downwardly and forwardly from the open molds. In one machine, the blow molded products fall into valleys in a rotating star wheel located below the ejection station. The products are collected in the valleys and, with rotation of the star wheel, are discharged onto a takeaway conveyor on one side of the wheel. In this machine, blow molded products may be discharged at sufficient velocity to bounce unpredictably off the star wheel as the star wheel stops the forward and downward motion of the bottles instantaneously. Additionally, the speed of the machine may be sufficiently great that the product cannot settle in the bottom of a star wheel valley before the star wheel is rotated to discharge the product on the takeaway conveyor. Both of the problems lead to improper placement of blow molded products on the takeaway conveyor.

In a conventional two parison machine, two blow molded products are simultaneously stripped from each mold and then released to gravity fall away from the mold at high speed. A takeaway device includes two tubular pneumatic tubes positioned to receive the ejected blow molded products and pneumatically convey the products to a takeaway conveyor. The tubes are maintained at negative pressure. In this device, both of the ejected blow molded products travel together toward the inlet ends of the pneumatic tubes. It is difficult to gravity drop each high speed product into the proper pneumatic conveyor tube.

In both the prior take-out devices, blow molded products ejected from high speed rotary blow molding machines are gravity dropped from between the molds and must be recaptured for proper placement on a takeaway conveyor. The star wheel device and the pneumatic conveyor device do not reliably recapture the ejected products to assure reliable placement on the takeaway conveyor.

Accordingly, there is a need for an improved take-out device for reliably and rapidly transferring blow molded products from open molds of a rotary blow molding machine at an ejection station to a takeaway conveyor. The device should physically capture the blow molded products of a single parison or dual parison between the mold halves at the ejection station without abruptly changing the velocity of the product, move the captured product or products away from the mold without gravity release and place the captured product or products on a takeaway conveyor in a known position for subsequent processing. The take-out device should operate rapidly and reliably and have a capability of removing one or two blow molded products from as many as 204 or more molds per minute without injury to the blow molded products. In the case of a dual parison machine rotary blow molding machine, the take-out device should be capable of removing 408 blow molded products or more per minute from between molds and reliably placing the products on a takeaway conveyor. The take-out device should place the blow molded products on a conveyor extending from the bottom of the blow molding machine, under the ejection station, and away from the back of the blow molding machine rather than to one side of the blow molding machine. The take-out device should turn the blow molded products ninety degrees around their length during transfer from the ejection station to the conveyor in order to place the products across, rather than lengthwise, on the conveyor.

Other objects and features of the invention will become apparent as the description proceeds, especially when taken in conjunction with the accompanying drawings illustrating the invention, of which there are eight sheets and two embodiments.

SUMMARY

In an embodiment, a blow mold system take-out device includes a plurality of transfer heads positioned around a hub, and a plurality of arms associated with a plurality of the transfer heads. The arms receive and clamp a molded product. Each transfer head with arms moves around the hub to a position where the arms release the molded product onto a takeaway device. Each transfer head with arms may include a base, such that the arms extend outwardly from the base. At least one of the arms on each transfer head is movable toward another arm on the transfer head to clamp a product between the arms. The arms may be positioned to be substantially parallel to each other. The transfer heads may rotate the product as the transfer heads move around the hub. Each arm may comprise a plate.

The device may also include a cam surface that moves the molded product from the arms to the takeaway device, such as a conveyor. Optionally, the arms may receive the molded product from an ejection station of a blow molding machine. Preferably, the molded product is received by the arms without an abrupt change in velocity.

The device may also include a spring mechanism that moves at least one of the arms toward the other. It may also include a plate spaced between the arms, and wherein each arm is movable toward the plate to receive a product between the arm and the plate. Further, it may include a transfer head turning assembly that turns a clamped molded product about an axis while it moves around the hub.

In another embodiment, a system receives products from a molding wheel of a blow molding machine. The molding wheel has a plurality of mold halves for molding blow molded products. The mold halves are moveable toward and away from each other in pairs. The system includes a mold ejection station and a receiving device having a receiving cavity for receiving the blow molded products from a set of mold halves and transferring the products along a conveyor. The receiving cavity includes walls having a first longitudinal direction substantially perpendicular to an opening direction of the mold halves when the product is released from the mold halves. The receiving cavity receives the product after the mold halves have rotated past a lowest point of rotation of the mold wheel to a position.

Optionally, the position of rotation of the mold wheel described above is between 6 o'clock and 9 o'clock of the mold wheel. Also optionally, the longitudinal direction of the walls may be non-horizontal when the receiving cavity receives the blow molded product.

In another embodiment, a system receives products from a molding wheel of a blow molding machine. The molding wheel has a plurality of mold halves for molding blow molded products. The mold halves are moveable toward and away from each other in pairs. The system includes :a mold ejection station and a take-out device. The take-out device includes arms that clamp and withdraw a blow molded product from open mold halves and transfer the product along the take-out device. The blow molded product is released from the system after the mold halves molding that product have rotated past a lowest point of rotation of the mold wheel to a position. Optionally, the position is between approximately 6 o'clock and 9 o'clock of the mold wheel.

Optionally, the arms have a longitudinal direction substantially perpendicular to the opening direction of the mold halves and substantially parallel to an axis of the blow molded product when receiving the product from the open mold halves. The arms also may comprise plats in an embodiment. Also optionally, the blow molded product is released onto a conveyor when released from the system. The system may also include a mechanism that moves at least one of the arms to clamp the blow molded product between the arms at the ejection station. The take-out device my also include a plurality of transfer heads mounted around a hub, and the arms are mounted on at least one of the transfer heads.

DESCRIPTION OF THE PREFERRED EMBODIMENTS

FIGS. 1–8 illustrate a two parison vertical rotary blow molding machine 10 and a rotary take-out device 12 for simultaneously removing two logs from molds of machine 10 and placing the logs on takeaway conveyor 14.

Figure 4:
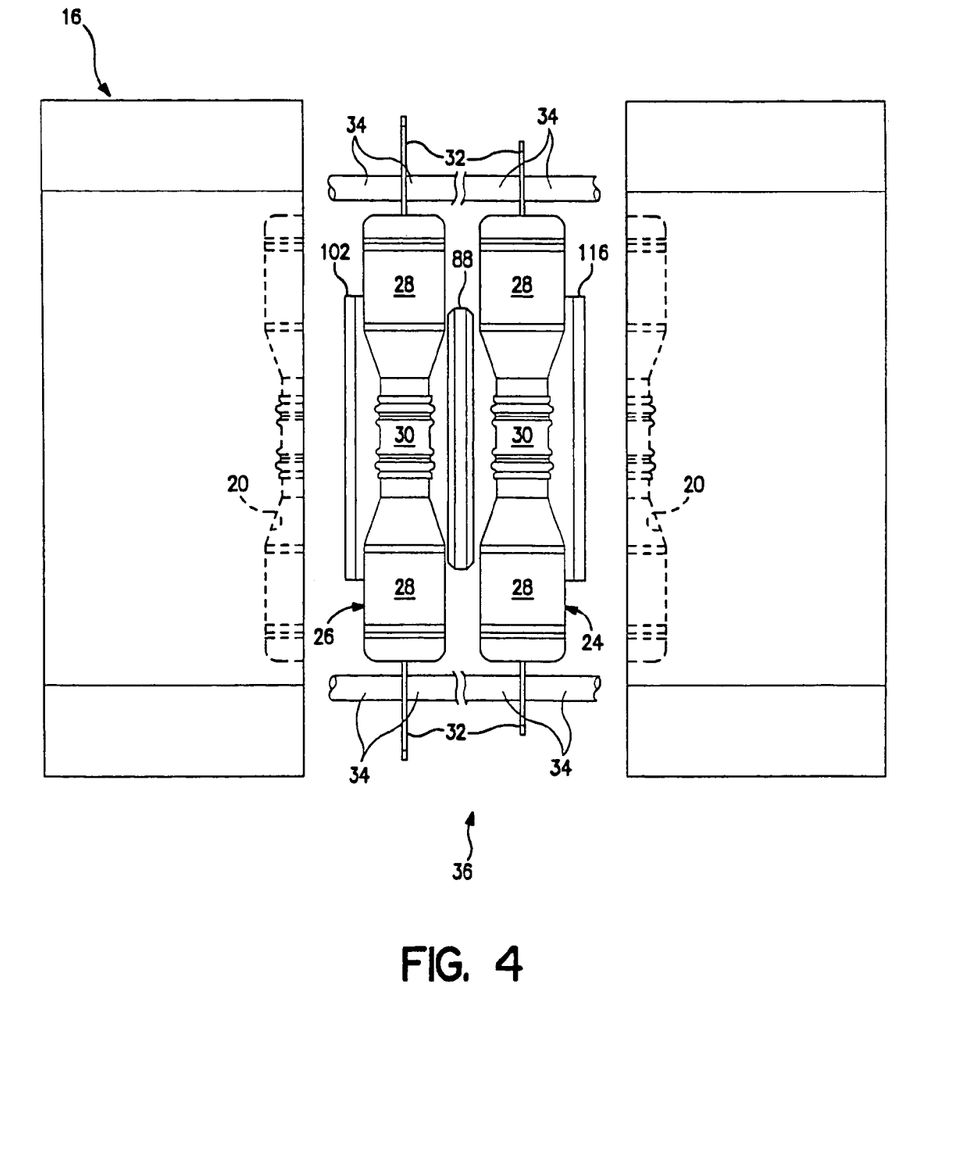
FIG. 4 is a top view of FIG. 3.

Blow molding machine 10 includes a frame (not illustrated) supporting twenty-four like blow molds 16 arranged in a circle around and supported by main shaft 18. A drive (not illustrated) rotates the molds in a circle around the main shaft in the direction of arrow 40. Each mold includes two mold halves moveable toward and away from each other in a direction parallel to the axis of the main shaft. Each mold half includes a radial inner recess 20 and an outer recess 22. When the mold is closed, the recesses define radial inner and outer cavities for blow molding parison portions to form radial inner logs or products 24 and radial outer logs or products 26. Each log includes two blow molded bottles 28, a blow dome 30 joining the necks of the bottles and tail flash 32 extending outwardly from the bottoms of the bottles at each end of the log. As shown in FIG. 4, the tail flash on outer log 26 is longer than the tail flash of log 24. Each log has a longitudinal axis.

Each mold 16 also includes a pair of knock out rods 34 for each log 24, 26. The rods 34 engage the tail flash for the logs and eject the logs to laterally spaced positions when the mold opens at ejection station 36. See FIG. 4.

Blow molding machine 10 includes a two parison extrusion head 38. Head 38 continuously extrudes a pair of side-by-side parisons between the open mold halves. Following extrusion, the mold halves close on the parison and the captured parison segments are blown and cooled in the mold cavities so that the plastic sets to form logs 24 and 26. The mold segments of each mold are opened prior to rotation of the mold to takeaway or ejection station 36 for removal of the logs by rotary take-out device 12. The machine 10 may include an in mold labeling device located between take-out device 12 and parison extruder 38 for placing labels in mold recesses 20 and 22. The open molds 16 are continuously rotated from the takeaway station past the in mold labeling device, if provided, past the parison extruder 38 and then close on the two parisons as previously described.

Figure 10:
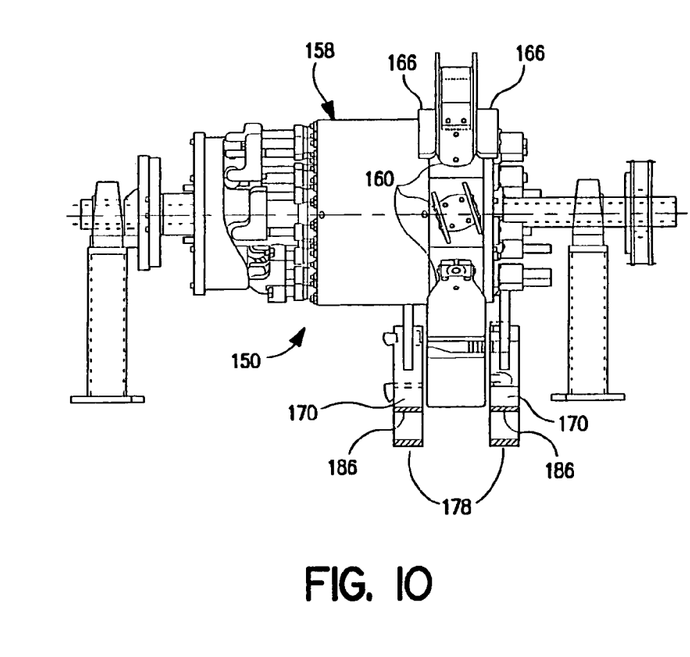
FIG. 10 is a view taken along line 10—10 of FIG. 9.

The blow molding machine 10 rotates molds 16 in the direction of arrow 40 shown in FIG. 10 at 8½ revolutions per minute or at higher speeds. At 8½ revolutions per minute, machine 10 molds 408 logs per minute and a mold is rotated past the ejection station each 0.29 seconds. Rotary take-out device 12 removes the logs from each mold as it passes station 36.

Figure 5:
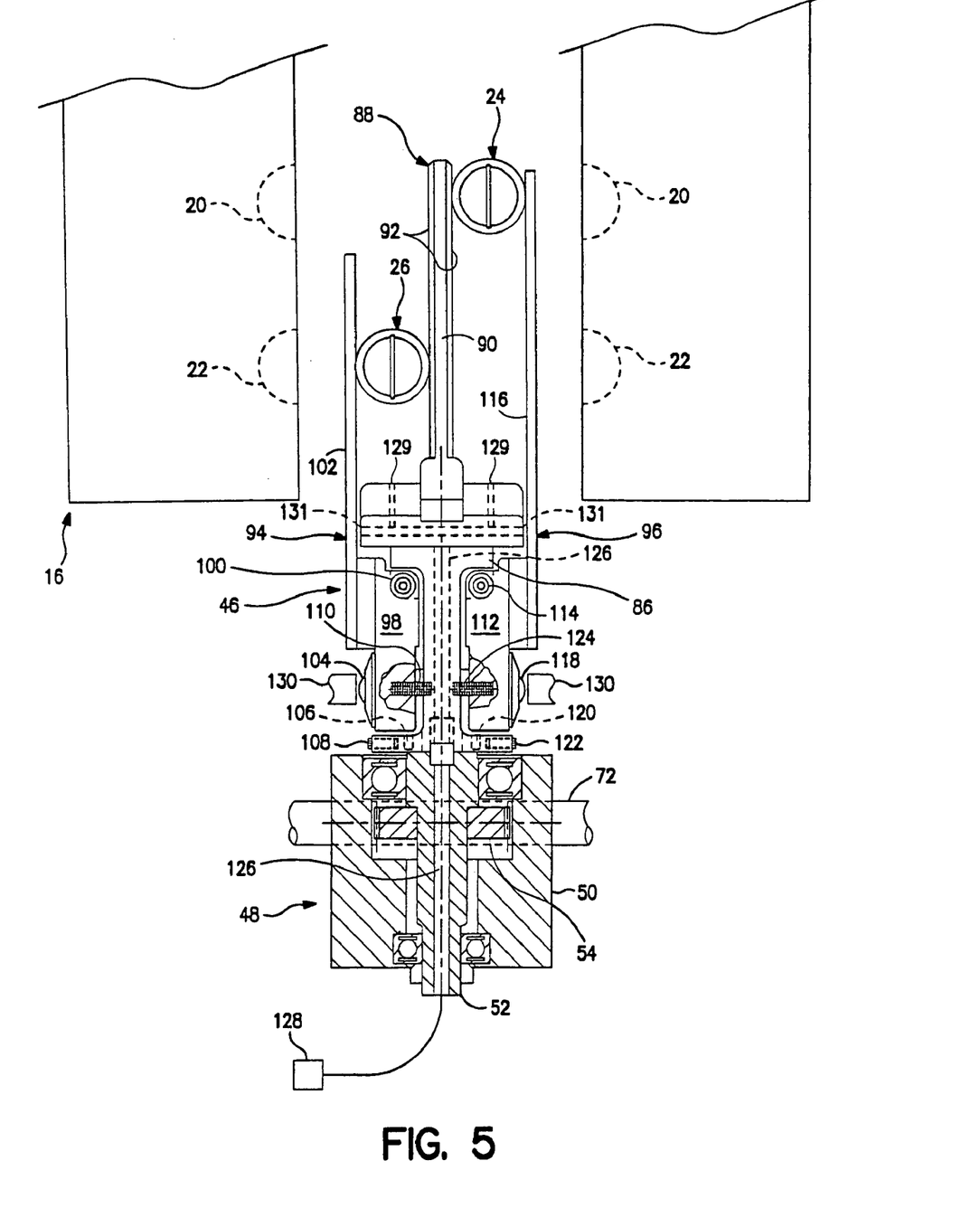
FIG. 5 is a view like FIG. 3 after capture of the logs by the head.

Device 12 is located below ejection station 36 of machine 10 and includes a rotary hub 42 mounted on horizontal support shaft 44 which extends parallel to main shaft 18. The hub is continuously rotated by the drive of machine 10 in the direction of arrow 44 to assure proper timing and log removal. Hub 42 carries eight equally spaced, removable transfer heads 46. The heads are rotated into open molds 16 at the ejection station, engage logs 24 and 26 between the open mold halves as shown in FIG. 5 and, upon retraction of the knock out rods 34, rotate the logs away from the mold and turn the logs ninety degrees for placement on conveyor 14.

Hub 42 includes a mounting and turning assembly 48 for each transfer head 46. Assemblies 48 are spaced circumferentially around the hub. Each assembly 48 includes a support block SO mounted on the hub between circular hub plates 56 rotatable with shaft 44. Rotary head support shaft 52 is rotatably mounted on block 50 for rotation about a radius extending from the axis of shaft 44. Head 46 extends radially outwardly from block 50 and is removably mounted on shaft 52. The shaft carries pinion gear 54. Plates 56 are located under the mold at ejection station 36 so that shaft 52 is centered equidistant between the open mold halves at ejection station 36.

Hub 42 includes a third circular plate 58 mounted on shaft 44 outwardly of plates 56. A fixed circular plate 60 supports circular cam 62 facing plate 58. The cam includes a flat lower dwell surface 64, flat upper dwell surface 66 and sloping rise surface 68 and fall surface 70 connecting the dwell surfaces.

Figure 2:
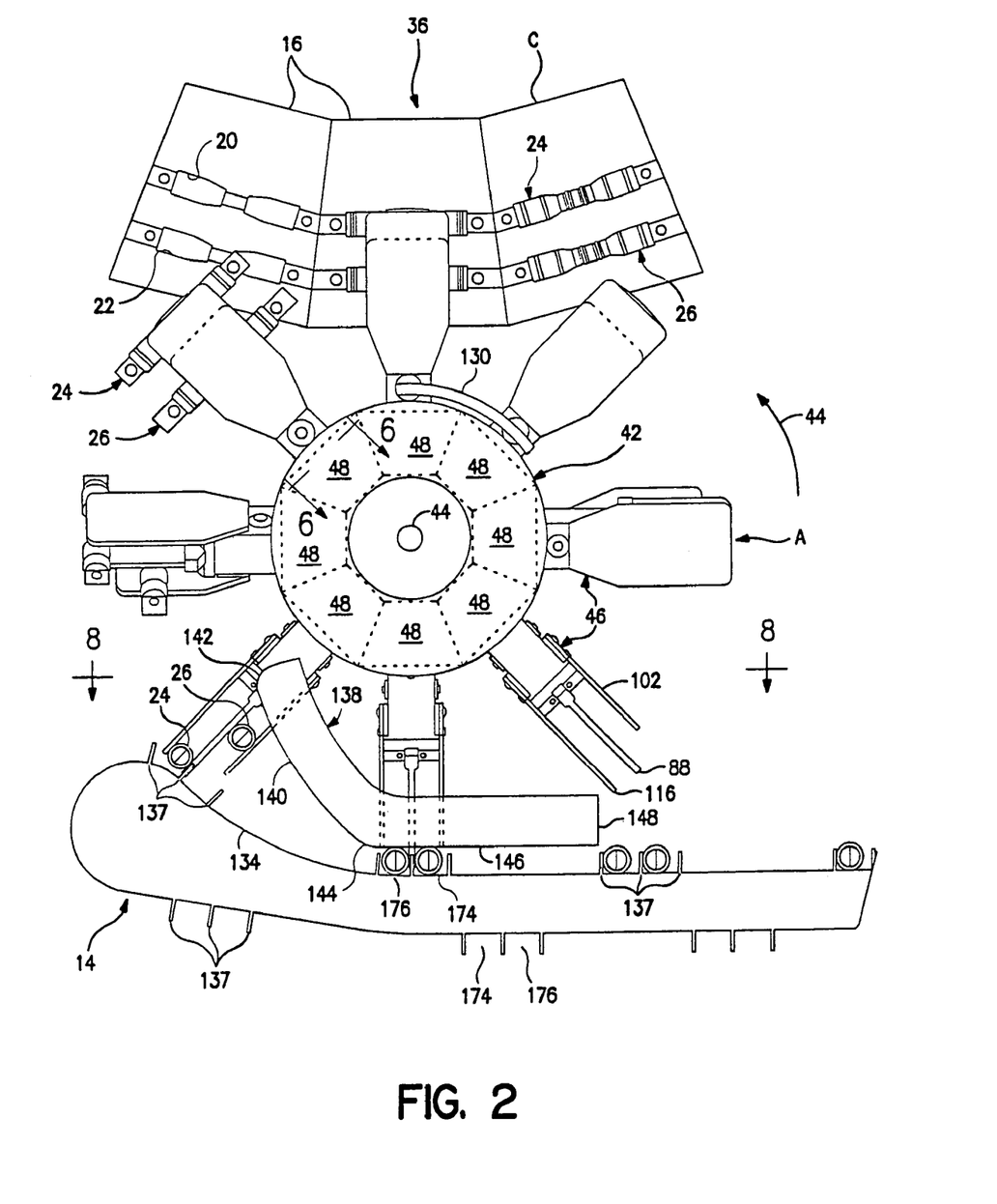
FIG. 2 is an enlarged view of a portion of FIG. 1.
Figure 6:
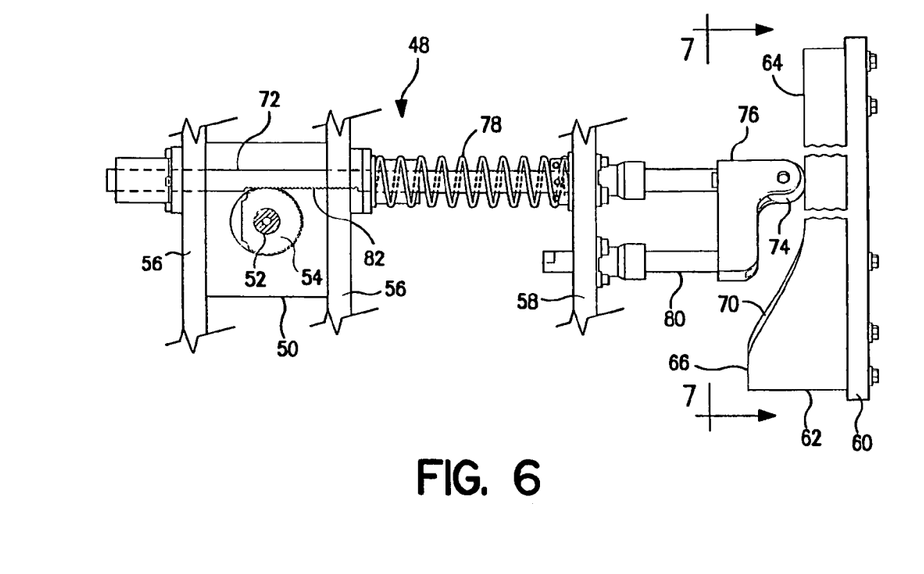
FIG. 6 is a sectional view taken generally along line 6—6 of FIG. 2.

Each assembly 48 includes a shaft 72 extending parallel to the axis of shaft 44 and through sleeve bearings on plates 56 and 58 as shown in FIG. 6. Roller 74 is mounted on car 76 which in turn is mounted on the end of shaft 72 adjacent cam 62. Spring 78 is confined between plate 56 and a collar on shaft 72 to hold roller 74 against cam 62. Car 76 is held against rotation on shaft 72 by short alignment shaft 80 which parallels shaft 72 and extends through a sleeve bearing on plate 58. Shaft 72 includes rack 82 which engages gear 54. Movement of roller 74 up rise surface 68 turns shaft 52 and transfer head 46 ninety degrees as shown in FIG. 2. Movement of roller 74 down fall surface 70 turns the shaft ninety degrees in the opposite direction to return the head to the initial position. The shaft and head do not turn during movement of roller 74 along the lower and upper dwell surfaces 64 and 66.

Figure 7:
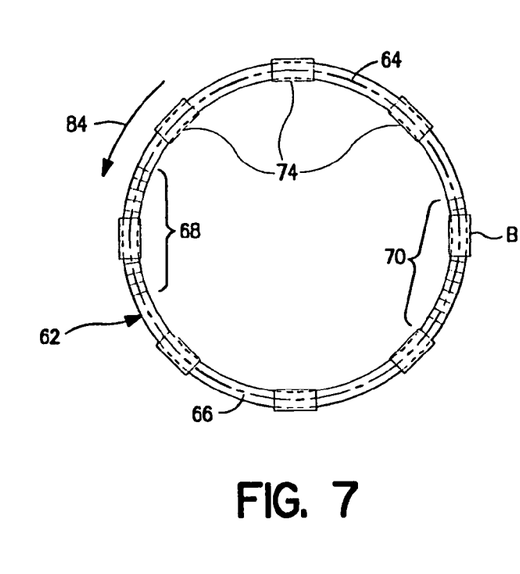
FIG. 7 is a view taken generally along line 7—7 of FIG. 6.

FIG. 7 illustrates cam 62, the circumferential locations of the rise and fall surfaces 68 and 70 and the eight rollers 74 engaging the cam. Roller 74 shown in FIG. 6 is located on the lower dwell surface 64 adjacent the lower end of rise surface 68. The rollers move around cam 62 in the direction of arrow 84.

As shown in FIG. 5, each transfer head 46 includes an arm support base 86 removeably mounted on and rotatable with shaft 52. A flat thin support plate or paddle 88 extends radially outwardly from the outer end of base 86. When the head is at the ejection station, plate 88 lies in a plane perpendicular to the axis of hub shaft 44 and parallel to the adjacent faces of the mold halves. When the head is adjacent conveyor 14, the plate is turned 90 degrees and lies in a plane extending through the axis. Plate 88 is located equidistant between the open mold halves at the ejection station 36 as illustrated. The plate 88 includes a central metal plate 90 and two outer plastic plates 92 which overlie the central plate. Plate 90 may be formed from aluminum. Plates 92 may be formed from polycarbonate plastic.

The transfer head includes two transfer arms 94, 96 mounted on opposite sides of base 86. Arm 94 includes a block 98 pivotally mounted on base 86 at bearing 100 and a flat, thin plate or paddle 102 overlying and generally paralleling plate 88. Arm 96 includes a block 112 mounted on base 86 at bearing 114 and a flat, thin plate or paddle 116 overlying and generally paralleling plate 88. When the head is at the ejection station plate 102 is adjacent one open mold half, plate 116 is adjacent the other open mold half and plate 88 is located centrally between the mold halves. Rotation of the arms 94, 96 about bearings 100, 114 pivots plates 102, 116 toward and away from plate 88. When the transfer head 46 is at the ejection station, plate 102 extends past adjacent mold recess 22 but does not extend past outer mold recess 20 and plate 116 extends past adjacent mold recess 22 and sufficiently past recess 20 to engage a log molded in the recess. The plates do not contact the mold halves during movement into and out from the molds.

Rounded cam follower 104 is mounted on block 98 inwardly of bearing 100 and faces away from base 86. The inner end of base 86 includes a stop member 106 which engages adjustable stop 108 on block 98 to limit rotation of the arm moving plate 102 toward plate 88. Spring 110 is confined between base 86 and block 98 below bearing 100 to bias the stop member toward the adjustable stop and plate 102 toward plate 88.

Arm 96 includes a cam follower 118, stop member 120, adjustable stop 122 and spring 124 corresponding to the previously described members of arm 94. Plates 88, 102 and 116 are flat, thin and rectangular and have the same width, although other shapes and types of plates may be used.

Airflow passage 126 extends from a source from compressed air 128 to two nozzles 129 on the outer end of base 86 and to two nozzles 131 each located on one side of the base adjacent a plate 102, 116. Compressed air is flowed through nozzles 129 and 131 as required to dislodge debris that may collect on the end of the base or between the base and the plates and disrupt bottle take-out. Debris, typically plastic flash on head 46 can prevent proper takeaway of blow molded logs or bottles from molds. Manual removal of debris requires shutdown of the entire blow molding machine.

Figure 3:
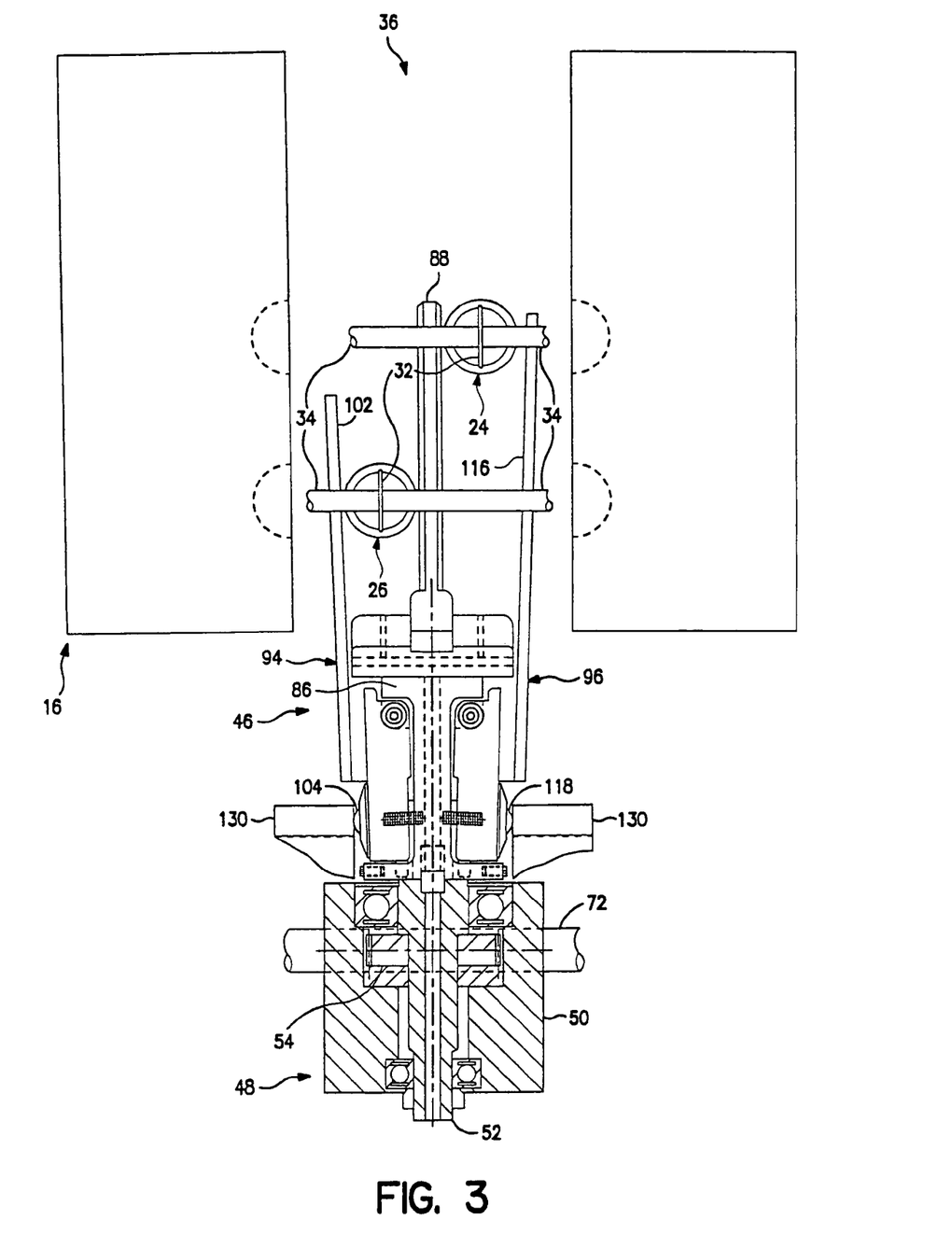
FIG. 3 is a view, partially broken away, illustrating a take-out head located between open mold halves prior to capture of blow molded logs stripped from the mold.

Take-out device 12 includes a pair of fixed, arcuate cams 130 each located in the path of movement of cam followers 104 and 118 as heads 46 are rotated to ejection station 36. Cams 130 force the cam followers inwardly to rotate plates 102 and 116 away from plate 88, increase the spacing between the plates and permit rotation of the separated plates to either side of the logs held between rods 34 as shown in FIG. 3. Immediately following rotation of the spaced plates to either side of the logs, the cam followers fall away from cams 130 so that springs 110 and 124 are released to rotate plates 102 and 116 toward plate 88 and clamp the logs between the plates. The springs bias plates 102 and 116 against the logs. Stop members 106 and 120 limit the clamping force on the logs to prevent deformation of the set, but not yet fully stabilized, logs. The cam followers fall away from the cams 130 when the plates are in the 12:00 o'clock position as shown in FIGS. 2 and 5. FIG. 3 illustrates the positions of the plates immediately prior to release and clamping of the logs. The logs are held in place between the mold halves by knockout rods 34 until the logs are clamped between the plates. Then, the knockout rods are rapidly retracted to complete transfer of the logs to head 46 for rotation with the head away from the blow molding machine.

Figure 1:
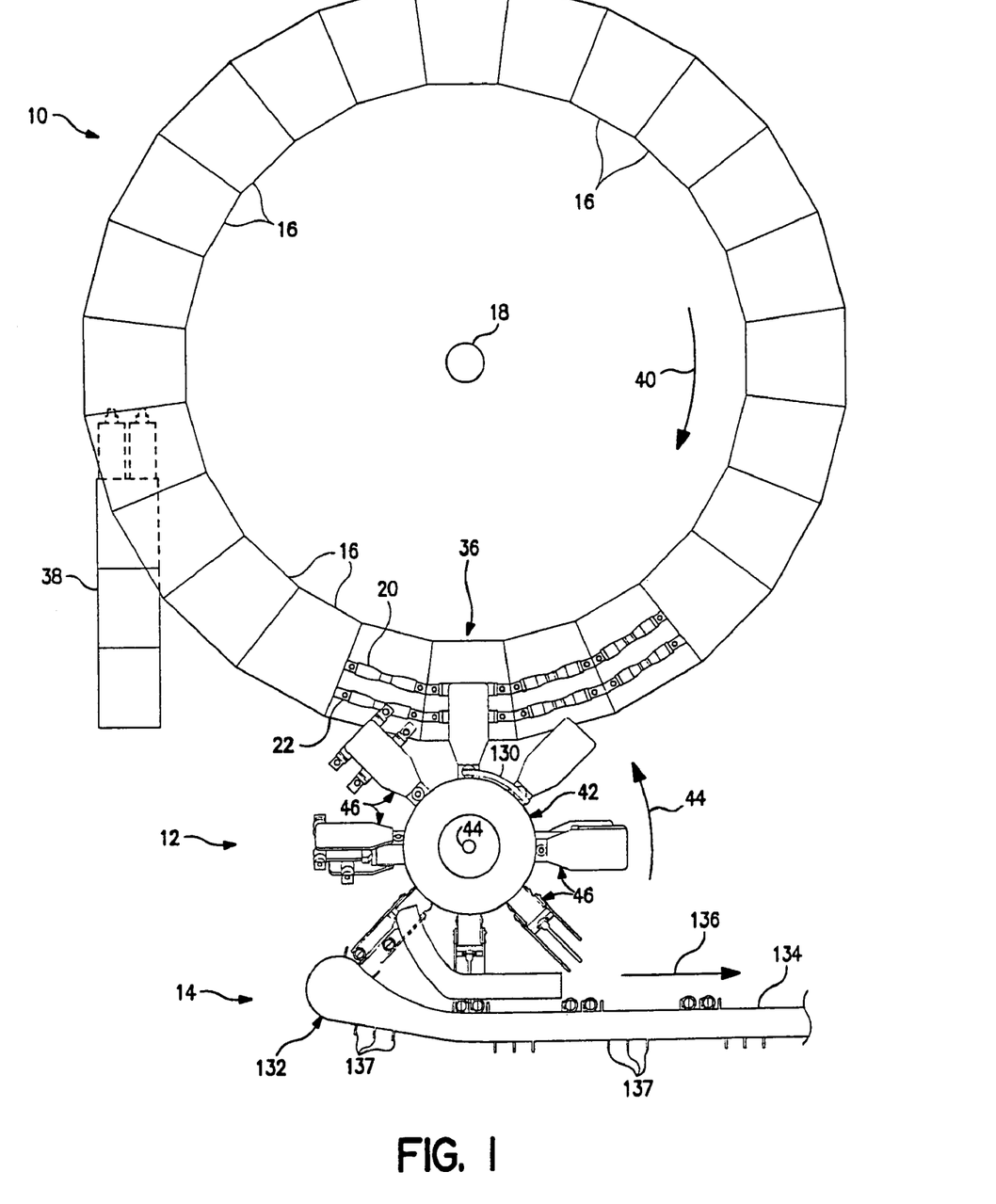
FIG. 1 is a side view of a blow molding machine with a first embodiment take-out device.
Figure 8:
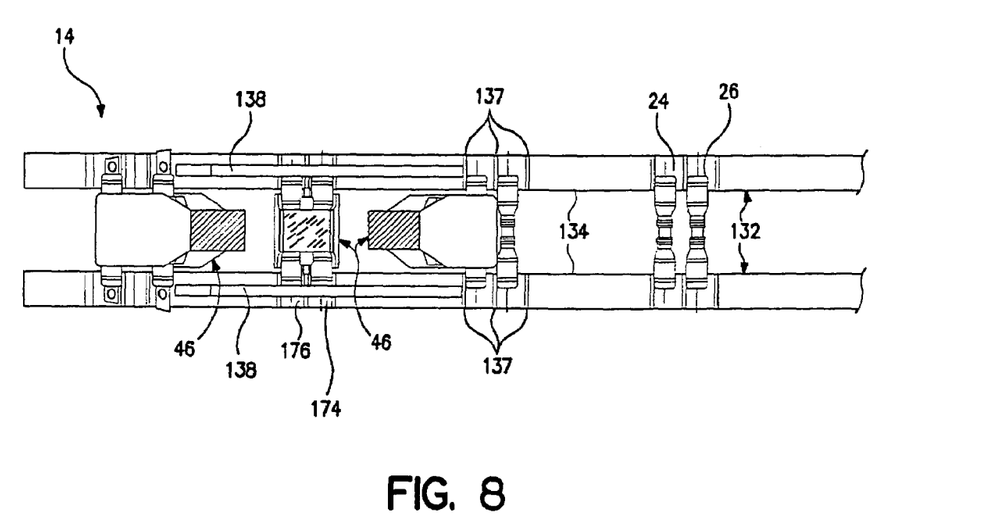
FIG. 8 is a view taken generally along line 8—8 of FIG. 2.

Takeaway conveyor or discharge device 14 includes two laterally spaced endless belts 132 each having an upper run 134 moved downstream in the direction of arrow 136 shown in FIG. 1. Each belt includes spaced sets of outwardly projecting lateral partitions or walls 137 defining two log receiving cavities 174, 176 therebetween. Walls 137 on each belt are aligned to receive the end portions of logs discharged from device 12, as shown in FIG. 8. Belts 132 are spaced apart a distance slightly greater than the width of the plates 88, 102 and 116 on transfer heads 14.

The upstream ends of upper runs 134 are curved upwardly to generally follow the circumference of take-out device 12. Rotation of the take-out device moves the outer ends of plates 88 and 116 a short distance above runs 134 with plate 88 in alignment with the center partition wall 37 of a group of walls on each belt. See FIG. 2. The takeaway conveyor 14 includes two-fixed discharge cam bars 138, each located below hub 42 and above one of the discharge conveyor belts. The discharge cam bars are located to either side of plates 88, 102 and 116.

Cam bars 138 include an ejection cam surface 140 extending diagonally across the rotary path of plates 88, 102 and 116 from a radial inner upstream end 142 to a radial outer, downstream end 144 located above a belt 132. Rotation of the plates in each transfer head past the takeaway conveyor moves the captured logs into engagement with the cam surfaces 140 and slides the logs radially along the plates and into pockets 176 between walls 137. The cam bars also include lower dwell surfaces 146 extending from ends 144 of surfaces 140 parallel to runs 134 to the downstream ends of the bars 148. Surfaces 146 are spaced above runs 134 slightly more than the diameter of the logs to hold the logs in the pockets.

The operation of the take-out device 12 and the takeaway conveyor for removing logs from open molds in machine 10 and placing the logs on the conveyor for processing will now be described.

The rotary drive for blow molding machine 10 rotates the hub and transfer heads of take-out device 12 counterclockwise as shown in FIG. 1 in the direction of arrow 44. The hub and transfer heads are rotated at a speed sufficient to position the plates of each transfer head between each open mold 16 at the ejection station to capture the logs from between the mold halves, rotate the logs out from between the mold halves, turn the logs ninety degrees about the radial axis of the transfer head and then place the logs in side-by-side parallel positions in compartments on the takeaway conveyor. Blow molding machine 10 has 24 molds and may rotate at a speed of 8½ revolutions per minute. Correspondingly, the take-out device hub 42 rotates at a speed of 25½ revolutions per minute.

Referring now to FIG. 2, transfer head "A" is located ninety degrees upstream from the ejection station 36. At this position, the roller 74 for transfer head "A", identified as "B" in FIG. 7, has moved nearly to the bottom of fall surface 70 and the rack and pinion drive 82, 54 has nearly turned head "A" to a position where the three plates 88, 102 and 116 on the head lie in planes perpendicular to the axes of main shaft 18 and take-out device shaft 44. Further rotation of the take-out device moves roller "B" to the lower dwell surface 64 to turn the plates into planes perpendicular to shafts 18 and 44. This occurs before the plates are rotated into open mold "C" approaching station 36. Also, the cam followers 104 and 118 engage cams 130 and pivot the plates 102 and 116 away from plate 88 to the position shown in FIGS. 3 and 4 before the plates are rotated into the open mold. Continued rotation of the take-out device moves the spread plates into the space between the open mold "C" as mold "C" moves to station 36. During this movement, the plates 88, 102 and 116 do not engage the mold halves or the knockout rods 34 which hold the logs in the staggered positions as illustrated. FIGS. 3 and 4 illustrate the positions of the three plates between the open mold halves at the ejection station. The central plate 88 extends between the two supported logs 24 and 26, plate 102 extends between log 26 and the adjacent mold half and plate 116 extends between log 24 and the other adjacent mold half. At the position of FIG. 2, the cam followers 104 and 118 move out of engagement with cams 130 so that springs 110 and 124 rotate plates 102 and 116 to clamp the logs against the central plate. The logs may be clamped against the central plate shortly before, during or shortly after retraction of rods 34, thus preventing free movement of the logs. During clamping, the ends of the two bottles 28 and tail flash 32 may flex elastically. Retraction of the rods releases the tail flash and permits the ends of the logs to return to their preflex shape. The logs are reliably clamped between the plates without abrupt change in their direction of movement.

After the logs have been captured between the plates, continued rotation of the take-out device 12 moves the captured logs and plates holding the logs out from between the open mold halves without contacting the mold halves. When the plates and held logs are completely withdrawn from between the mold halves, the roller 74 for the transfer head holding the logs is moved up rise surface 68 to turn the head 46 ninety degrees about the radial axis of the head and turn the axes of the logs parallel to the axis of shaft 44 and the plates to planes parallel to or intersecting the axis of shaft 44. The roller 74 moves onto the upper dwell surface 66 to complete turning of the transfer head before the plates and logs are moved to the take-out conveyor 14.

During transfer of logs 24 and 26 from a mold in machine 10 to take-out device 12, log 26 is transferred from a radial outer mold cavity to a radial inner position on device 12 and log 24 is transferred from a radial inner mold cavity to a radial outer position, that is, outwardly from log 26.

Continued rotation of the take-out device brings the ends of now inner log 26 into engagement with cam surfaces 140 to slide the log radially outwardly past plates 88 and 102 and then deposit the log in the adjacent compartments 174 on the takeaway belts. The ends of log 24 also engage cam surfaces 140 to slide the log into compartments 176 on belts 132 upstream from compartments 174.

Continued rotation of the take-out mechanism moves the ends of the logs along dwell surfaces 146 on cam bars 138. These surfaces parallel the upper runs of belts 132. The dwell surfaces 146 hold the logs in the two compartments between walls 137 as the plates are rotated away from the conveyor belt leaving the logs in the compartments. Takeaway conveyor 14 conveys the logs downstream for further operations, typically trimming away of the blow dome and tail flash.

As soon as the plates 88, 102 and 116 have been rotated away from cam bars 138 the roller 74 for the transfer head moves down fall surface 70 to turn the transfer head ninety degrees back to the position where the three plates lie in planes perpendicular to the axes of shafts 18 and 44, thus completing a cycle of operation.

The high rotational speed of blow molding machine 10 rotates logs 24 and 26 to the ejection station at high speeds. The speeds are sufficiently great that if the logs were released from the molds for free movement, impact with fixed members could damage the logs and render them unusable. Further, the logs bounce unpredictably making capture and placement on a conveyor difficult. Take-out device 12 prevents free movement of the logs during takeout from molds by capturing the logs at the ejection station at or extremely soon before or after retraction of the knock out rods releases the logs from the mold. The logs do not fall free out of the molds. The logs are clamped between the plates in a known position without abruptly changing their direction of movement.

Transfer of the logs from the heads 46 and placement onto the takeaway conveyor 14 is performed without release of the logs and with minimal frictional engagement between the logs and the clamp plates. Log 24 is blow molded in a radially inward mold cavity, is held between the ends of plates 88 and 116 and is slid a short distance to the ends of the plates during discharge to the takeaway conveyor. Log 26, blow molded in the radially outwardly mold cavity, is slid a short distance along plates 88 and 102 before discharge. Plate 102 is shorter than plates 88 and 116 to reduce possible wear between the log and the plates during discharge. The outer end of plate 102 is spaced a distance above the adjacent wall 137 less than the diameter of the log to ensure the log is positively transferred to compartment 174.

Figure 9:
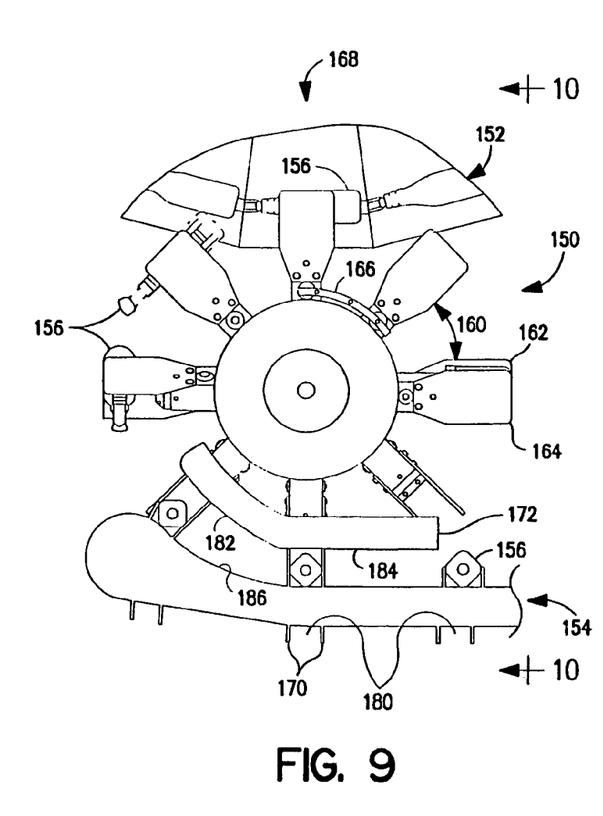
FIG. 9 is a view similar to FIG. 2 illustrating a second embodiment take-out device.

FIGS. 9 and 10 illustrate a second embodiment rotary takeaway device 150 for use in removing single blow molded bottles from a vertical rotary blow molding machine 152 and placing the bottles on takeaway conveyor 154. Blow molding machine 152 is like blow molding machine 10 with exception that a single parison extrusion head is provided and the molds each define a single cavity for blow molding a single bottle or product 156. The bottle is elongate and defines a longitudinal axis.

Takeaway device 150 includes a hub 158 identical to hub 42 except that different single bottle transfer heads 160 are mounted on the eight mounting and turning assemblies spaced around the hub. The transfer heads 160 are mounted on the mounting and turning assemblies like previously described assemblies 48. Each transfer head 160 includes an arm support base, like previously described base 86, and a pair of clamp arms, like previously described clamp arms 94 and 96. The clamp arms include plastic clamp plates 162 and 164, like previously described plates 102 and 116, except that these plates are equal in length. A central plate, like plate 88, is not provided. Heads 160 also include an airflow passage and nozzles like passage 126 and nozzles 130 and 132, previously described.

Device 150 also includes a pair of cams 166, like previously described cams 130, for spreading apart plates 162 and 164 when they rotate into the open mold at ejection station 168. The cams release plates 162 and 164 to engage a bottle 156 as previously described. Knockout rods locate the bottles centrally between the open mold halves.

The takeaway conveyor includes two laterally spaced endless belts 178 with upper runs 186 which extend around and then away from the outer circumference of device 150, like takeaway conveyor 14 previously described. Pairs of spaced walls or partitions 170 define single compartments 180 spaced along both belts. Rotation of the take-out device 150 moves blades 162 and 164 between the two belts, as shown in FIG. 10.

Discharge cam bars 172, like previously described cam bars 138, are located between the drum of device 150 and the takeaway conveyor belts. The cam bars include an angled discharge surface 182 and a flat dwell surface 184 extending along the conveyor belts.

Device 150 operates like device 12 with the exception that a single bottle is extracted from each mold by each transfer head. Also, the bottle is clamped between two plates 162, 164 which are each biased toward the other, rather than being clamped against a single, fixed central plate. The plates move into the open mold without engaging the mold or the bottle. The plates and bottle move out of the mold without engaging the mold.

If desired, device 150 may be modified to substitute a fixed plate for one of the plates 162 or 164 such that the fixed plate and the single pivoted plate would be rotated into the mold to either side of a bottle at the ejection station. The spring biased plate would then clamp the bottle against the fixed plate and the bottle would be rotated outwardly from between the mold, as previously described.

The mounting and turning assemblies of hub 158 turn the heads and extracted bottles ninety degrees prior to movement to the takeaway conveyor 154, as previously described. Additionally, the assemblies turn the plates back to the take-out position, in planes perpendicular to the axis of rotation, before rerotation into an open mold half at the ejection station for extraction of a following bottle, again as described previously.

Rotation of a bottle held between plates 162 and 164 into the take-out conveyor brings the bottle into engagement with cam surfaces 182 to move the bottle radially outwardly and into a compartment 180 between a pair of adjacent walls 170. The cam dwell surface 184 holds the bottle in the compartment as the plates are rotated away from the conveyor. The bottle is held near the ends of the plates to minimize frictional wear against the plates during placement on conveyor 154. Machine 152 and take-out device 150 operate at the same high speed as machine 10 and device 12.

Disclosed take-out devices remove either blow molded logs or blow molded bottles from a blow molding machine and place the logs or bottles on a takeaway conveyor. As used herein, "blow molded product" includes blow molded bottles, logs and other products formed by blow molding.

The disclosed paddles or plates 88, 102, 116 and 162 and 164 are relatively thin, flat plates which are moved into the space between the molds at the ejection station to capture and remove one or two blow molded products. The disclosed plates or paddles may be formed from thin polycarbonate plastic sheets or from aluminum plates with overlying plastic or from other materials. Obviously, other types of plates may be used within the scope of the invention. For example, "plates" or "plate" as used herein include other members which may be moved into open mold halves for clamping and withdrawing blow molded products from between the mold halves. For instance, plates may include a plurality of spaced rods or wires. Plates may include woven members capable of clamping and withdrawing blow molded products. The plates need not be flat, rectangular, or of equal size. The plates may be curved so long as the plates can be moved into an open mold to clamp and withdraw blow molded products.

Take-out devices 12 and 150 each include a plurality of transfer heads 146, 160 which are rotated into open mold halves at ejection stations, clamp blow molded products in the mold between two plates and are then rotated from the mold halves to the takeaway conveyor. Clearly, other types of non-rotary drives may be used to move the transfer heads into the open mold halves and from the mold halves to the takeaway conveyor. For instance, the transfer heads could be mounted on a chain moving between the ejection station and the conveyor so that successive heads are moved into open molds at the ejection station and are then carried along the chain to the conveyor for placement of the products on the conveyor. Other types of drives for the transfer heads may be used if desired. Additionally, the logs may be placed longitudinally along the conveyor, rather than turned ninety degrees to the conveyor and placed transversely on the conveyor as disclosed.

While we have illustrated and described preferred embodiments of our invention, it is understood that this is capable of modification, and we therefore do not wish to be limited to the precise details set forth, but desire to avail ourselves of such changes and alterations as fall within the purview of the following claims.

What is claimed is:

1. A blow mold system take-out device, comprising:
a plurality of transfer heads positioned around a hub; and
a plurality of arms associated with a plurality of the transfer heads, wherein the arms receive and clamp a molded product;

wherein a plate is spaced between the arms;

wherein each arm is movable toward the plate to receive a product between the arm and the plate;

wherein each transfer head with arms moves around the hub to a position where the arms release the molded product onto a takeaway device.

2. The device of claim 1 wherein each transfer head with arms includes a base, the arms extend outwardly from the base, and at least one of the arms on each transfer head is movable toward another arm on said transfer head to clamp a product between the arms.

3. The device of claim 2 wherein the arms are positioned to be substantially parallel to each other.

4. The device of claim 1, wherein the transfer heads rotate the product as the transfer heads move around the hub.

5. The device of claim 1 wherein each arm comprises a plate.

6. The device of claim 1 further comprising a cam surface that moves the molded product from the arms to the takeaway device.

7. The device of claim 1 wherein the takeaway device comprises a conveyor.

8. The device of claim 1 wherein the arms receive the molded product from an ejection station of a blow molding machine.

9. The device of claim 8 wherein the molded product is received by the arms without an abrupt change in velocity.

10. The device of claim 1 further comprising a spring mechanism that moves at least one of the arms toward the other.

11. The device of claim 1 further comprising a transfer head turning assembly that turns a clamped molded product about an axis while it moves around the hub.

12. A system for receiving products from a molding wheel of a blow molding machine, the molding wheel having a plurality of mold halves for molding blow molded products, where the mold halves are moveable toward and away from each other in pairs, the system comprising:

a mold ejection station; and a receiving device having a receiving cavity for receiving the blow molded products from a set of mold halves and transferring the products along a conveyor;

wherein the receiving cavity includes walls having a first longitudinal direction substantially perpendicular to an opening direction of the mold halves when the product is released from the mold halves;

wherein the receiving cavity receives the product after the mold halves have rotated past a lowest point of rotation of the mold wheel to a position.

13. The system of claim 12, wherein the position is between 6 o'clock and 9 o'clock of the mold wheel.

14. The system of claim 12, wherein the longitudinal direction of the walls is non-horizontal when the receiving cavity receives the blow molded product.

15. A system for use with a blow molding machine having a molding wheel, the molding wheel having a plurality of mold halves for molding blow molded products, where the mold halves are moveable toward and away from each other in pairs, the system comprising:

a mold ejection station; and a take-out device including arms on either side of a plate that clamp and withdraw a blow molded product between the arms and the plate from open mold halves and transfer the product along the take-out device;

wherein the blow molded product is released from the system after the mold halves molding that product have rotated past a lowest point of rotation of the mold wheel to a position.

16. The system of claim 15, wherein the position is between approximately 6 o'clock and 9 o'clock of the mold wheel.

17. The system of claim 15, wherein the arms have a longitudinal direction substantially perpendicular to the opening direction of the mold halves and substantially parallel to an axis of the blow molded product when receiving the product from the open mold halves.

18. The system of claim 15, wherein the arms comprise plates.

19. The system of claim 15 wherein the blow molded product is released onto a conveyor when released from the system.

20. The system of claim 15 further comprising a mechanism that moves at least one of the arms to clamp the blow molded product between the arms at the ejection station.

21. The system of claim 15 wherein the take-out device further comprises a plurality of transfer heads mounted around a hub, and the arms are mounted on at least one of the transfer heads.

22. A blow mold system take-out device, comprising:

a plurality of transfer heads positioned around a hub;

a plurality of arms associated with a plurality of the transfer heads, wherein the arms receive and clamp a molded product; and a cam surface that engages the molded product and moves the molded product from the arms to the takeaway device; wherein each transfer head with arms moves around the hub and rotates the molded product to a position where the arms place the molded product transversely on a takeaway device.

23. The device of claim 22 wherein each transfer head with arms includes a base, the arms extend outwardly from the base, and at least one of the arms on each transfer head is movable toward another arm on the transfer head to clamp a product.

24. The device of claim 22 wherein the molded product is received from an ejection station of a blow molding machine by the arms without an abrupt change in velocity.

* * * * *